United States Patent
Tsuda et al.

(10) Patent No.: US 12,254,458 B2
(45) Date of Patent: Mar. 18, 2025

(54) PAYMENT PROCESSING SYSTEM, PAYMENT PROCESSING METHOD, AND RECORDING MEDIUM

(71) Applicant: NEC Corporation, Tokyo (JP)

(72) Inventors: Shunsuke Tsuda, Tokyo (JP); Hajime Hagimori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 40 days.

(21) Appl. No.: 17/908,044

(22) PCT Filed: Feb. 15, 2021

(86) PCT No.: PCT/JP2021/005414
§ 371 (c)(1),
(2) Date: Aug. 30, 2022

(87) PCT Pub. No.: WO2021/192716
PCT Pub. Date: Sep. 30, 2021

(65) Prior Publication Data
US 2023/0102033 A1    Mar. 30, 2023

(30) Foreign Application Priority Data
Mar. 27, 2020   (JP) ................................. 2020-057433

(51) Int. Cl.
*G06Q 20/22*    (2012.01)
*G06Q 20/12*    (2012.01)
*G06Q 30/06*    (2023.01)

(52) U.S. Cl.
CPC ............. *G06Q 20/22* (2013.01); *G06Q 20/12* (2013.01); *G06Q 30/06* (2013.01)

(58) Field of Classification Search
CPC ...................................................... G06Q 40/00
(Continued)

(56) References Cited

U.S. PATENT DOCUMENTS 6,997,378 B2 *  2/2006  Phillips .................. G06Q 30/04
                                                      705/30
7,107,243 B1 *  9/2006  McDonald ............. G06Q 20/10
                                                      705/40
(Continued)

FOREIGN PATENT DOCUMENTS

JP  2012-243171 A   12/2012
JP  2018-136731 A    8/2018
(Continued)

OTHER PUBLICATIONS

International Search Report for PCT Application No. PCT/JP2021/005414, mailed on May 11, 2021.
(Continued)

*Primary Examiner* — Kirsten S Apple

(57) ABSTRACT

A payment processing system according to an aspect of the present disclosure includes: at least one memory configured to store instructions; and at least one processor configured to execute the instructions to: associate a plurality of customers; specify a product acquired by each of the plurality of customers in a store; and perform at least one of: processing of collective payment by a customer who is a payer among the plurality of customers when it has been determined that all of the plurality of customers have left the store, for products acquired by the plurality of customers, or processing of separate payment by the customer who is the payer when it has been determined that each of the plurality of customers has left the store, for products acquired by the customer.

14 Claims, 17 Drawing Sheets

(58) Field of Classification Search
USPC .................................................. 705/38, 35
See application file for complete search history.

(56) References Cited

U.S. PATENT DOCUMENTS

| | | | | |
|---|---|---|---|---|
| 7,962,424 | B1* | 6/2011 | Colosso | G06Q 30/06 705/901 |
| 8,438,066 | B1* | 5/2013 | Yuen | G06Q 20/4015 705/16 |
| 8,606,714 | B1* | 12/2013 | Cameo | G06Q 20/4037 705/40 |
| 9,373,112 | B1* | 6/2016 | Henderson | G06Q 30/0201 |
| 9,665,858 | B1* | 5/2017 | Kumar | G06Q 20/42 |
| 9,911,290 | B1* | 3/2018 | Zalewski | G07G 1/0072 |
| 10,304,053 | B1* | 5/2019 | Templeton | G01B 7/14 |
| 10,489,829 | B1* | 11/2019 | Isgar | G06Q 30/0279 |
| 11,042,863 | B1* | 6/2021 | Omojola | G06Q 20/40 |
| 2002/0072944 | A1* | 6/2002 | Artinger | G06Q 10/063 705/28 |
| 2003/0163397 | A1* | 8/2003 | Mayo | G06Q 30/02 705/34 |
| 2005/0149544 | A1* | 7/2005 | Bishop | G06Q 20/04 |
| 2008/0177581 | A1* | 7/2008 | Artinger | G06Q 40/08 705/4 |
| 2010/0179837 | A1* | 7/2010 | Artinger | G06Q 40/08 715/708 |
| 2013/0132274 | A1* | 5/2013 | Henderson | G06Q 20/3224 705/41 |
| 2013/0191189 | A1* | 7/2013 | Aparicio | G07B 15/02 705/13 |
| 2013/0277423 | A1* | 10/2013 | Toyokawa | G07G 1/009 235/375 |
| 2014/0149282 | A1* | 5/2014 | Philliou | G06Q 20/357 705/39 |
| 2014/0279459 | A1* | 9/2014 | Weiss | G06Q 20/26 705/40 |
| 2014/0304186 | A1* | 10/2014 | Brown | G06Q 30/0279 705/329 |
| 2014/0358783 | A1* | 12/2014 | Mansur | G06Q 20/10 705/44 |
| 2015/0213716 | A1* | 7/2015 | Aggarwal | G08G 1/146 340/932.2 |
| 2015/0294431 | A1* | 10/2015 | Fiorucci | G07B 15/02 705/13 |
| 2016/0092874 | A1* | 3/2016 | O'Regan | G06Q 20/3221 705/44 |
| 2017/0084116 | A1* | 3/2017 | Anderson | G07F 17/3225 |
| 2017/0098210 | A1* | 4/2017 | Laracey | G06Q 20/3224 |
| 2017/0178117 | A1* | 6/2017 | McClard | G06Q 20/223 |
| 2018/0183802 | A1* | 6/2018 | Choyi | H04L 63/205 |
| 2018/0190040 | A1* | 7/2018 | Batten | G06Q 20/405 |
| 2018/0240090 | A1 | 8/2018 | Yokoyama | |
| 2020/0058013 | A1* | 2/2020 | Carter | G06Q 20/20 |
| 2020/0349548 | A1* | 11/2020 | Mangle | G06Q 30/0206 |
| 2021/0027318 | A1 | 1/2021 | Yamasaki et al. | |
| 2021/0090057 | A1 | 3/2021 | Takeno | |
| 2021/0110666 | A1* | 4/2021 | Thomas | H04W 4/021 |
| 2021/0304558 | A1* | 9/2021 | Palmisano | G07F 17/3241 |
| 2022/0101288 | A1* | 3/2022 | Georgiadis | G06Q 20/4015 |

FOREIGN PATENT DOCUMENTS

| | | |
|---|---|---|
| JP | 2018-160108 A | 10/2018 |
| JP | 2018-163533 A | 10/2018 |
| JP | 2021-061511 A | 4/2021 |
| WO | 2019/181499 A1 | 9/2019 |

OTHER PUBLICATIONS

English translation of Written opinion for PCT Application No. PCT/JP2021/005414, mailed on May 11, 2021.

JP Office Action for JP Application No. 2022-509393, mailed on Oct. 29, 2024 with English Translation.

* cited by examiner

Fig.3

MEMBER INFORMATION

| MEMBER ID | CHARACTERISTIC INFORMATION | SETTLEMENT INFORMATION |
|---|---|---|
| M1 | FC1 | A1 |
| : | : | : |

Fig.4

CUSTOMER INFORMATION

| CUSTOMER ID | CHARACTERISTIC INFORMATION | SETTLEMENT INFORMATION | STORE LEAVING FLAG |
|---|---|---|---|
| C1 | FC1 | A1 | n |
| C2 | FC2 | - | n |
| C3 | FC3 | - | n |
| : | : | : | : |

GROUP INFORMATION

| GROUP ID | PAYER ID | COMPANION ID |
|---|---|---|
| G1 | C1 | C2, C3 |
| : | : | : |

Fig.8

ACQUIRED PRODUCT
INFORMATION

| CUSTOMER ID | ACQUIRED PRODUCT |
|---|---|
| C1 | I1 |
| C2 | I2 |
| C3 | I3 |
| ⋮ | ⋮ |

PAYMENT PROCESSING SYSTEM, PAYMENT PROCESSING METHOD, AND RECORDING MEDIUM

This application is a National Stage Entry of PCT/JP2021/005414 filed on Feb. 15, 2021, which claims priority from Japanese Patent Application 2020-057433 filed on Mar. 27, 2020, the contents of all of which are incorporated herein by reference, in their entirety.

TECHNICAL FIELD

The present disclosure relates to a payment processing system, a payment processing method, and a program.

BACKGROUND ART

In a general store, a customer acquires a product desired to purchase from a shelf and then moves to a point of sales (POS) terminal (also referred to as a register), and a store clerk causes the POS terminal to read the product for making a payment. The customer himself or herself may cause the POS terminal to read the product desires to purchase. When the customer purchases a plurality of products, it takes a long time to cause the POS terminal to read all the products.

As a technology for improving efficiency of payment for products in a store, PTL 1 discloses a payment processing apparatus that detects a product acquired by a customer from a shelf by image recognition. The payment processing apparatus according to PTL 1 performs payment for the detected product with a credit card number or a bank account number registered in advance.

In the payment processing apparatus of PTL 1, as a method in which a plurality of customers shops in a group, a payer registered in advance and a companion who is not registered are associated with each other. PTL 1 discloses that the payer associated with a companion also pays for a product acquired by the companion. In this case, the payment for the product acquired by the companion is made every time the product is acquired by the companion while the payer is at the store or when the payer leaves the store.

CITATION LIST

Patent Literature

[PTL 1] JP 2018-160108 A

SUMMARY OF INVENTION

Technical Problem

In the technology disclosed in PTL 1, when the payer leaves the store, the companion cannot continue shopping.

An object of the present disclosure is to provide a payment processing apparatus, a payment processing method, and a program that solve the above-described problem and enable, when a plurality of customers is shopping in a group, a companion to continue shopping even after a payer has left the store.

Solution to Problem

A payment processing system according to one aspect of the present disclosure includes a customer associating means configured to associate a plurality of customers, a product specifying means configured to specify a product acquired by each of the plurality of customers in a store, and a payment processing means configured to collectively perform, when it has been determined that all of the plurality of customers have left the store, payment processing by a customer who is a payer among the plurality of customers for products acquired by the plurality of customers, or perform, when it has been determined that each of the plurality of customers has left the store, payment processing by the customer who is the payer for products acquired by the customer.

A payment processing method according to one aspect of the present disclosure includes associating a plurality of customers, specifying a product acquired by each of the plurality of customers in a store, and collectively performing, when it has been determined that all of the plurality of customers have left the store, payment processing by a customer who is a payer among the plurality of customers for products acquired by the plurality of customers, or performing, when it has been determined that each of the plurality of customers has left the store, payment processing by the customer who is the payer for products acquired by the customer.

A recording medium according to one aspect of the present disclosure non-temporarily records a program for causing a computer to execute processing of associating a plurality of customers, processing of specifying a product acquired by each of the plurality of customers in a store, and processing of collectively performing, when it has been determined that all of the plurality of customers have left the store, payment processing by a customer who is a payer among the plurality of customers for products acquired by the plurality of customers, or performing, when it has been determined that each of the plurality of customers has left the store, payment processing by the customer who is the payer for products acquired by the customer.

Advantageous Effects of Invention

According to the present disclosure, if a plurality of customers is shopping in a group, a companion can continue shopping even after the payer has left the store.

BRIEF DESCRIPTION OF DRAWINGS

FIG. 3 is a diagram illustrating an example of member information according to the first example embodiment.

FIG. 4 is a diagram illustrating an example of customer information according to the first example embodiment.

FIG. 8 is a diagram illustrating an example of acquired product information according to the first example embodiment.

EXAMPLE EMBODIMENT

Figure 1:
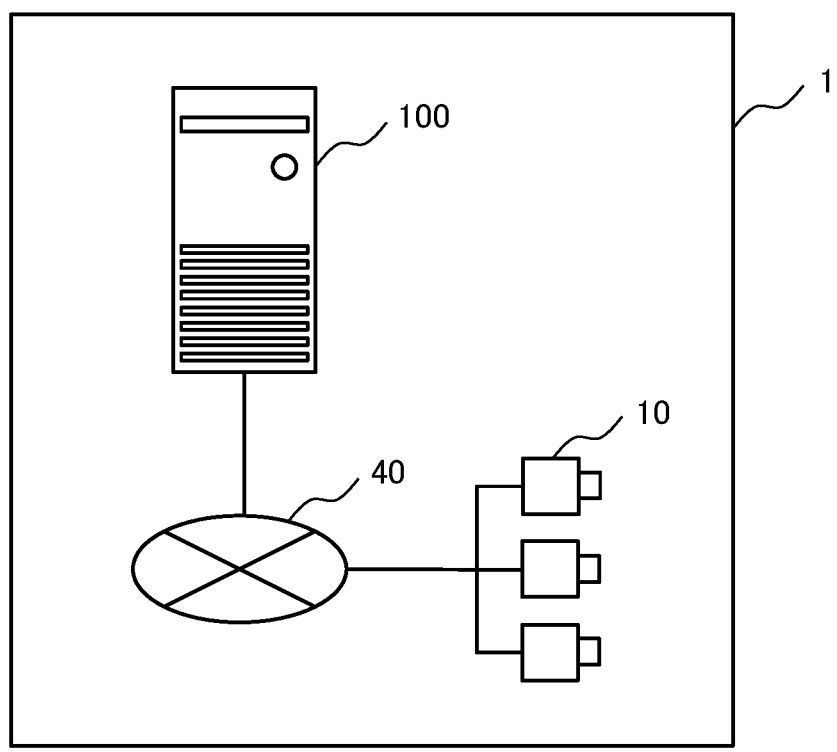
FIG. 1 is a block diagram illustrating a configuration of a payment processing system 1 according to a first example embodiment.

Hereinafter, example embodiments of the present disclosure will be described with reference to the drawings, but the present disclosure is not limited to the example embodiments. In the drawings described below, components having the same function are denoted by the same reference numerals, and repeated description thereof may be omitted.

First Example Embodiment

[Configuration]

FIG. 1 is a block diagram illustrating a configuration of a payment processing system 1 according to a first example embodiment. The payment processing system 1 includes a plurality of cameras 10 and a payment processing apparatus 100. The cameras 10 and the payment processing apparatus 100 are connected by at least one of a wired connection and a wireless connection via an arbitrary network 40 such as a local area network or the Internet. The cameras 10 and the payment processing apparatus 100 may be directly connected.

The cameras 10 are imaging devices. The cameras 10 each include, for example, an image sensor such as a charge coupled device (CCD) sensor or a complementary metal oxide semiconductor (CMOS) sensor.

The cameras 10 are provided at a plurality of positions of a store, such as near an entrance of the store, a place where products are displayed in the store (hereinafter, also referred to as a selling area), or near an exit of the store. The camera 10 provided near the entrance captures an image of a customer entering the store. The camera 10 provided at the selling area captures an image of a customer and a product present at the selling area. The camera 10 provided near the exit captures an image of a customer leaving the store. In the store, any number of cameras 10 are provided in an arrangement capable of capturing customers and products present anywhere in the store.

The camera 10 transmits image data including an image acquired by image capturing to the payment processing apparatus 100.

The payment processing apparatus 100 specifies a customer who has acquired a product and the acquired product on the basis of the image acquired by the camera 10, and performs payment processing for the product.

The payment processing apparatus 100 is achieved on a single computer or a plurality of computers. The payment processing apparatus 100 may be installed in the store. The payment processing apparatus 100 may be achieved on a cloud that is a set of computer resources.

Figure 2:
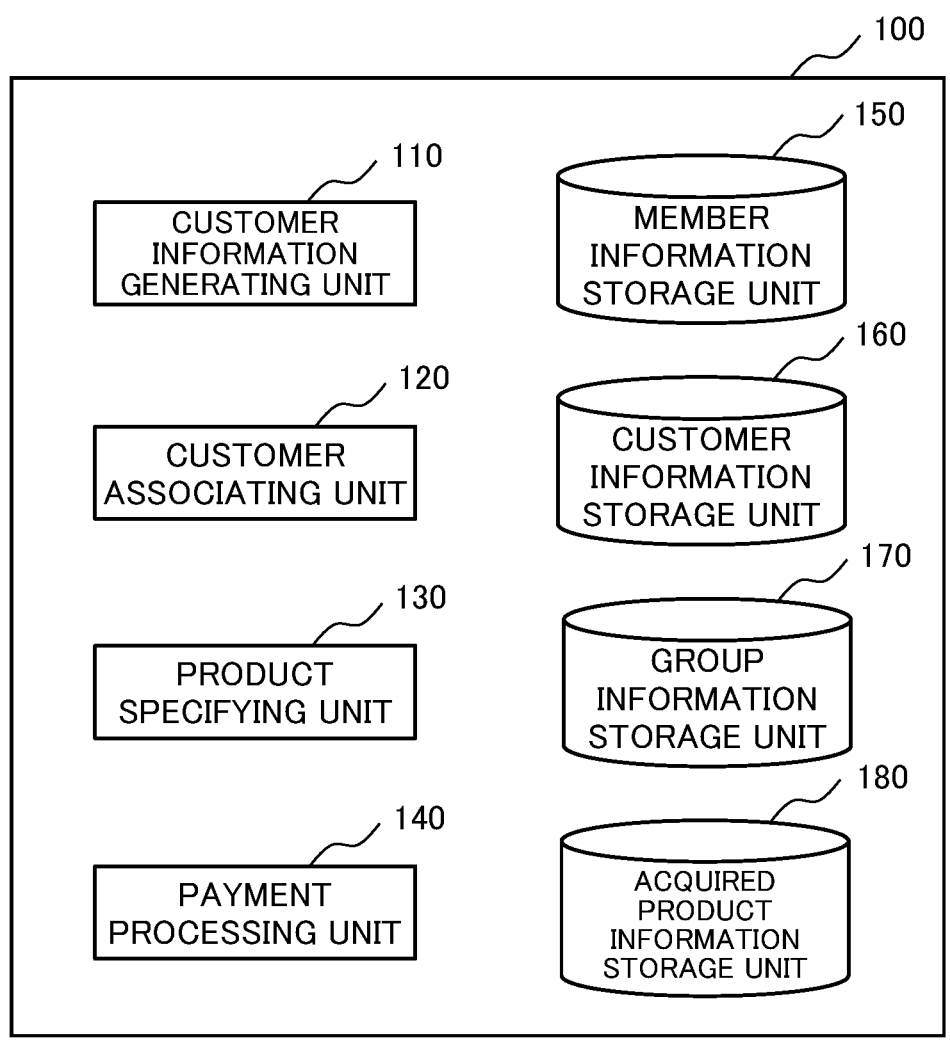
FIG. 2 is a block diagram illustrating a configuration of a payment processing apparatus 100 according to the first example embodiment.

FIG. 2 is a block diagram illustrating a configuration of the payment processing apparatus 100 according to the first example embodiment. The payment processing apparatus 100 includes a customer information generating unit 110, a customer associating unit 120, a product specifying unit 130, and a payment processing unit 140. The payment processing apparatus 100 includes a member information storage unit 150, a customer information storage unit 160, a group information storage unit 170, and an acquired product information storage unit 180 as storage units.

The member information storage unit 150 stores member information. The member information is information regarding a member who is a customer registered in the store. FIG. 3 is a diagram illustrating an example of member information according to the first example embodiment. As illustrated in FIG. 3, the member information includes, for example, a member identifier (ID) of each member, characteristic information of the member, and settlement information.

The member ID is an identifier for identifying the member.

The characteristic information is information for determining that a customer who has entered the store is a member using image data of the customer. The characteristic information may be image data itself of a region including the face of the member, or may be a characteristic amount calculated from the image data of the region including the face of the member.

The settlement information is information used for payment processing of shopping, and is, for example, a credit card number or a bank account number of the member.

Registration of the member information in the member information storage unit 150 is performed by an arbitrary method.

The customer information generating unit 110 issues a customer ID to be described later with respect to the customer entering the store, and generates customer information.

The customer information generating unit 110 determines whether the customer entering the store is a member. For example, the customer information generating unit 110 acquires image data of the customer from the camera 10 provided near an entrance of the store. Next, the customer information generating unit 110 determines whether the customer entering the store is a member (registered customer) by using the characteristic information of the customer obtained from the image data and the characteristic information of each member included in the member information read from the member information storage unit 150.

The customer information generating unit 110 may determine whether the customer entering the store is a member by using information other than the image data of the customer.

For example, the customer information generating unit 110 may determine whether the customer entering the store is a member by using biometric information such as an iris, a vein, and a fingerprint. In this case, characteristic information related to these pieces of biometric information is set in the characteristic information of the member information. The customer information generating unit 110 acquires the biometric information of the customer using a biometric information reading device set near the entrance of the store, and determines whether the customer entering the store is a member using the characteristic information obtained from the acquired biometric information and the characteristic information of the member information.

The customer information generating unit 110 may determine whether the customer entering the store is a member by using a member ID acquired from a membership card presented by the customer or a screen displayed on a mobile terminal possessed by the customer. In this case, the member information may not include the characteristic information. The customer information generating unit 110 acquires the member ID of the customer using a bar code reader or a camera, which are not illustrated, set near the entrance of the store.

The customer information generating unit 110 may determine whether the customer entering the store is a member by using the member ID acquired from the mobile terminal possessed by the customer by short-range wireless communication such as near field communication (NFC).

The customer information generating unit 110 further issues a customer ID for the customer who has entered the store, and generates customer information. The customer ID is an identifier for identifying a customer. The above-described member ID may be used as the customer ID. The customer information is information regarding a customer who has entered the store (who is staying in the store). FIG. 4 is a diagram illustrating an example of the customer information according to the first example embodiment. As illustrated in FIG. 4, the customer information includes, for example, the customer ID of each customer, the characteristic information of the customer, the settlement information, and a store leaving flag.

The characteristic information is information for determining a staying customer by using image data of the customer. Similarly to the characteristic information of the member information, the characteristic information may be the image data itself of the region including the face of the customer, or may be a characteristic amount calculated from the image data of the region including the face of the customer. The characteristic information obtained from the image data of the customer acquired from the camera 10 provided near the entrance of the store is set as the characteristic information. When the customer is a member, the characteristic information of the member information (characteristic information obtained from the image data of the member) may be set as the characteristic information.

The settlement information is information used for payment processing of shopping related to the customer, and is, for example, a credit card number or a bank account number of the customer. In a case where the customer who has entered the store is a member, the settlement information of the member information is set in the settlement information. The settlement information may be input and set after the customer enters the store. When the customer who has entered the store is not a member, it is not necessary to set the settlement information.

The store leaving flag is a flag indicating whether the customer has left the store (having left the store (y)) (having not left the store (n)). At the timing when the customer information is generated, "having not left the store (n)" is set in the store leaving flag.

Every time the customer enters the store, the customer information generating unit 110 stores the generated customer information in the customer information storage unit 160 and inputs the generated customer information to the customer associating unit 120.

The customer information storage unit 160 stores the customer information generated by the customer information generating unit 110.

When customers who shop in a group enter the store together (continuously), the customer associating unit 120 specifies the customers belonging to the group and generates group information to be described later.

The customer associating unit 120 determines customers as customers belonging to the same group, the customers being a plurality of customers who has continuously entered the store and having the number of customers designated at the time of entrance of a head customer. Here, for example, the number of customers is designated by the head customer or a store clerk by an input-output device (for example, the terminal device), not illustrated, set at the entrance of the store.

The customer associating unit 120 specifies the customer ID of each customer belonging to the group. Here, the customer associating unit 120 specifies the customer ID on the basis of the customer information input from the customer information generating unit 110 every time the customer enters the store.

Further, the customer associating unit 120 determines a payer of the group. Here, the customer associating unit 120 determines a customer for which the settlement information is set in the customer information input from the customer information generating unit 110 among the customers belonging to the group as the payer.

Figures 5, 6:
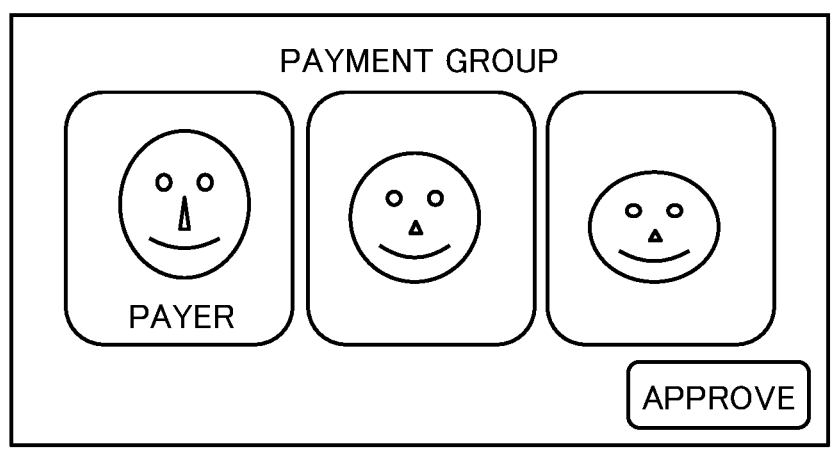
FIG. 5 is a diagram illustrating an example of a group confirmation screen according to the first example embodiment.
FIG. 6 is a diagram illustrating an example of group information according to the first example embodiment.

The customer associating unit 120 may display a group confirmation screen to the customer belonging to the group on the input-output device (for example, the terminal device), which is not illustrated, provided at the entrance of the store, and receive an input for approving the group and the determined payer. FIG. 5 is a diagram illustrating an example of a group confirmation screen according to the first example embodiment. In the group confirmation screen of FIG. 5, face images of customers belonging to the group are arranged, and the payer is indicated. An approval button for approving the group and the payer is illustrated.

In a case where there is a plurality of customers of which the settlement information is set in the customer information of the customers belonging to the group, the customer associating unit 120 may indicate the customers of which the settlement information is set as candidates for the payer on the group confirmation screen, and receive a designation of a customer as the payer.

When there is no customer of which the settlement information is set in the customer information of the customers belonging to the group, the customer associating unit 120 may receive a designation of a customer as the payer and an input of the settlement information of the payer on the group confirmation screen. In this case, the customer associating unit 120 sets the input settlement information in the settlement information in the customer information of the designated customer.

The customer associating unit 120 then generates group information. The group information is information for associating a plurality of customers belonging to a group.

FIG. 6 is a diagram illustrating an example of group information according to the first example embodiment. As illustrated in FIG. 6, the group information includes, for example, a group ID of each group, a payer ID of the group, and a companion ID. The group ID is an identifier for identifying a group. The group ID is issued by the customer associating unit 120. The payer ID is the customer ID of a customer who is a payer among customers belonging to the group. The companion ID is the customer ID of a customer (hereinafter, also referred to as accompanying person) other than the payer among the customers belonging to the group.

The customer associating unit 120 stores the generated group information in the group information storage unit 170.

The group information storage unit 170 stores the group information generated by the customer associating unit 120.

The product specifying unit 130 specifies a customer who has acquired a product and the acquired product on the basis of the image data acquired by the cameras 10 provided in the store.

Figure 7:
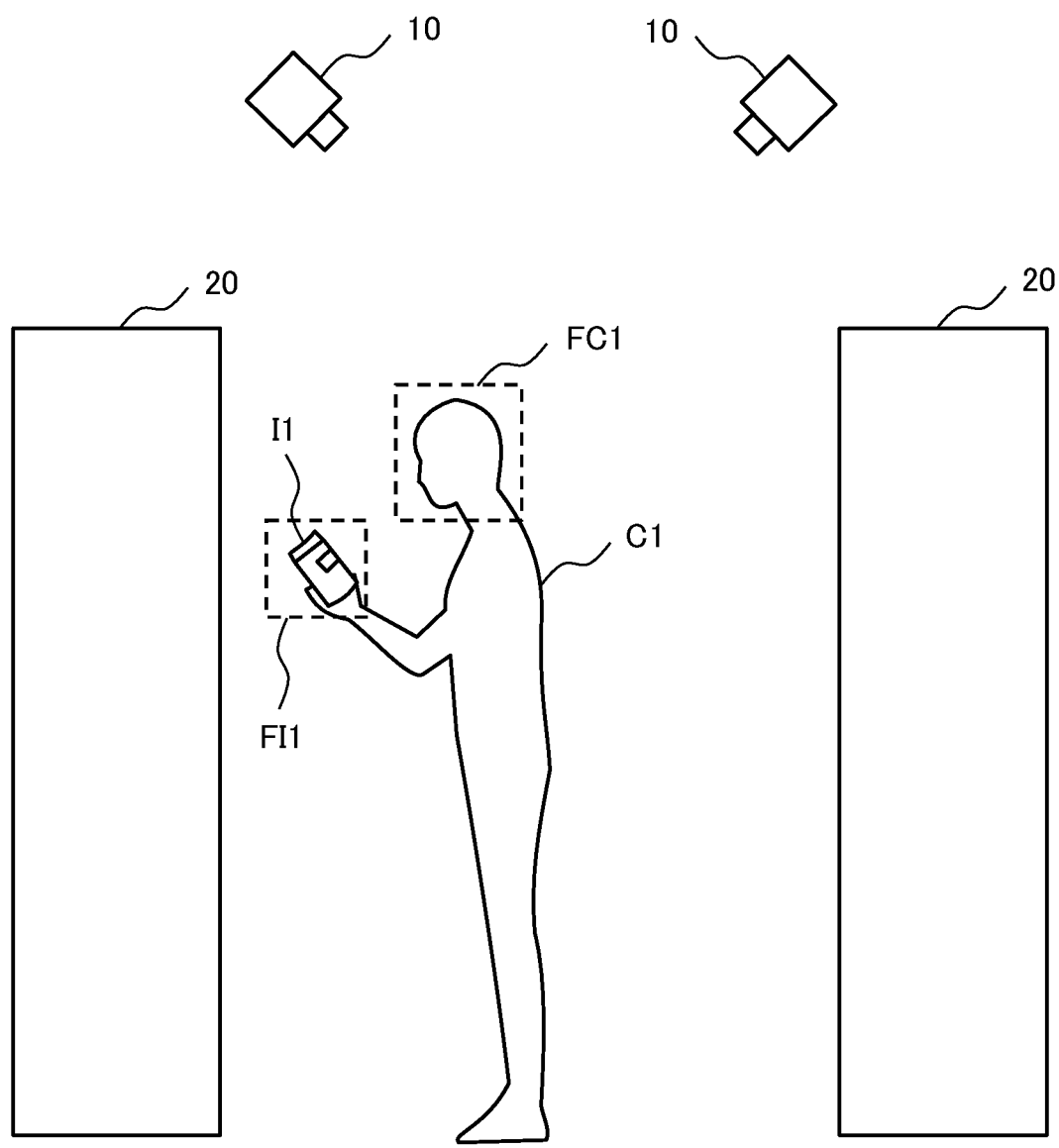
FIG. 7 is a schematic diagram illustrating a state of a store according to the first example embodiment.

FIG. 7 is a schematic diagram illustrating a state of the store according to the first example embodiment. A shelf 20 is installed in the store, and one or more products are arranged on the shelf 20. In the vicinity of the shelf 20, the cameras 10 are provided at positions where regions including the face of the customer and the product can be captured.

The product specifying unit 130 acquires the image data of the region including the product from the camera 10, and acquires the characteristic information of the product from the image data. The product specifying unit 130 detects that the product is removed from the shelf 20 using the characteristic information of the product. For example, the product specifying unit 130 detects that the product is taken out by detecting that the characteristic information of the product moves from the inside to the outside of a region related to the shelf 20 (or from a contact position to a non-contact position) between a plurality of pieces of image data continuous in time series. The region related to the shelf 20 in the image data may be recorded in advance as coordinates in the image data, or may be determined by image recognition of the shelf 20 from the image data. The product specifying unit 130 may detect acquisition of the product by the customer by detecting that the product is put in a bag (or shopping basket) of the customer from the image data.

The product specifying unit 130 further acquires image data of the region including the face of the customer who has taken out the product (that is, the product acquirer) from the camera 10. The customer who has taken out the product is, for example, a customer closest to the removed product. The product specifying unit 130 may acquire image data of a region including the hand of a customer from the camera 10, and specify the customer who has taken out the product on the basis of the position and movement of the hand. The product specifying unit 130 acquires the characteristic information of the customer from the image data. The product specifying unit 130 associates the characteristic information of the product acquirer with the characteristic information of the product taken out. In FIG. 7, characteristic information FC1 of a customer C1 and characteristic information FI1 of a product I1 are schematically illustrated as dashed line frames.

The product specifying unit 130 determines which customer the product acquirer is by comparing the characteristic information of the product acquirer with the characteristic information of the customer information read from the customer information storage unit 160. Known image recognition techniques can be used to determine a customer on the basis of the characteristic information of the customer.

The product specifying unit 130 generates acquired product information. The acquired product information is information indicating the product acquired by the customer from the shelf 20. FIG. 8 is a diagram illustrating an example of the acquired product information according to the first example embodiment. For example, as illustrated in FIG. 8, the acquired product information includes the customer ID of the customer who has acquired the product and the product ID of the acquired product.

The product specifying unit 130 stores the generated acquired product information in the acquired product information storage unit 180.

The acquired product information storage unit 180 stores the acquired product information generated by the product specifying unit 130.

The payment processing unit 140 performs payment processing by the payer for products acquired by the payer and the companion included in the group information.

The payment processing unit 140 specifies the customer leaving the store on the basis of the image data from the camera 10 provided near the exit of the store. Here, the payment processing unit 140 specifies the customer on the basis of the characteristic information obtained from the image data and the characteristic information of the customer information read from the customer information storage unit 160.

The payment processing unit 140 then refers to the group information read from the group information storage unit 170 and specifies the group to which the specified customer belongs. Further, the payment processing unit 140 refers to the group information and determines whether the specified customer is a payer or a companion in the specified group.

The payer and the companion may leave the store separately or together. If leaving separately, the payer may leave first or the companion may leave first.

For example, when it is determined that all the customers (payer and all the companions) belonging to the group have left the store, the payment processing unit 140 may collectively perform settlement processing by the payer for the products acquired by all the customers (payer and all the companions) belonging to the group. In this case, the payment processing unit 140 refers to the group information, extracts the customers of the group to which the specified customer belongs, and refers to the store leaving flags of the customer information of the customers to determine whether all the customers belonging to the group have left the store.

Alternatively, when it is determined that the payer of the group has left the store, the payment processing unit 140 may perform the settlement processing by the payer for the product acquired by the payer. When it is determined that each companion of the group has left the store, the payment processing unit 140 may perform the settlement processing by the payer for the product acquired by the companion.

The payment processing unit 140 refers to the acquired product information read from the acquired product information storage unit 180, and acquires the product ID of the product acquired by the customer who is the payer or the companion. In a case where the customer leaving the store is a companion, the payment processing unit 140 refers to the group information and specifies the payer of the group to which the companion belongs. The payment processing unit 140 refers to the customer information read from the customer information storage unit 160 and acquires the settlement information of the payer. The payment processing unit 140 then performs settlement processing using the acquired settlement information of the payer for the product having the acquired product ID.

The payment processing unit 140 sets (updates) the store leaving flag of the customer information of the customer who has left the store to "y".

[Operation]

Hereinafter, an operation of the payment processing apparatus according to the first example embodiment will be described with reference to the drawings.

Here, it is assumed that the member information as illustrated in FIG. 3 is stored in the member information storage unit 150. It is assumed that three customers, which are the customer of a member M1 in the member information of FIG. 3 and two customers who are not members, enter the store together (continuously) to shop in a group.

(Customer Information Generation/Association Processing)

Figure 9:
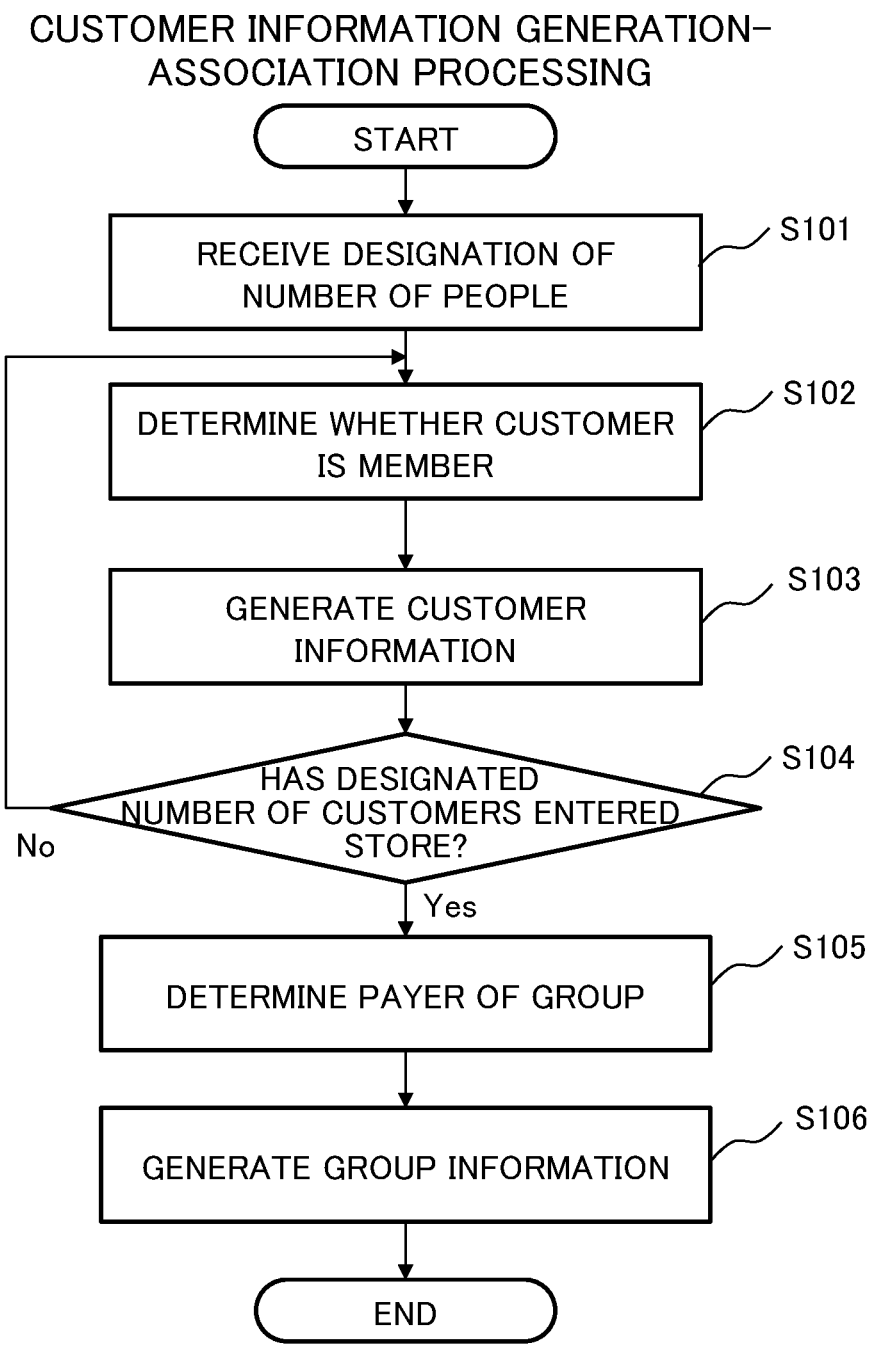
FIG. 9 is a flowchart illustrating customer information generation/association processing according to the first example embodiment.

FIG. 9 is a flowchart illustrating customer information generation/association processing according to the first example embodiment. The customer information generation/association processing is executed when customers who shop in a group enter the store.

The customer associating unit 120 receives a designation of the number of people in the group (step S101). For example, the customer associating unit 120 receives the number of people "3".

When a customer of the group enters the store, the customer information generating unit 110 determines whether the customer who has entered the store is a member (step S102). For example, the customer information generating unit 110 determines that the first customer is the member M1 on the basis of the member information of FIG. 3.

The customer information generating unit 110 generates the customer information regarding the customer who has entered the store (step S103). The customer associating unit 120 acquires the generated customer information. For example, as illustrated in FIG. 4, the customer information generating unit 110 generates the customer information of the customer C1 related to the member M1. In the settlement information of the customer C1, the settlement information of the member M1 in the member information of FIG. 3 is set. The customer associating unit 120 acquires the customer information of the customer C1.

The processing of steps S102 and S103 is repeated until the designated number of customers enters the store (step S104). For example, the customer information generating unit 110 determines that the second and third customers are not members, and generates the customer information of the customers C2 and C3 as illustrated in FIG. 4. The customer associating unit 120 acquires the customer information of the customers C2 and C3.

When the designated number of people enters the store (step S104/YES), the customer associating unit 120 determines the payer of the group (step S105). For example, the customer associating unit 120 determines the customer C1 of which the settlement information is set in the customer information of FIG. 4 as the payer.

The customer associating unit 120 generates the group information (step S106). For example, as illustrated in FIG. 6, the customer associating unit 120 generates the group information in which the payer C1 and companions C2 and C3 are set for a group G1.

(Product Specifying Processing)

Figure 10:
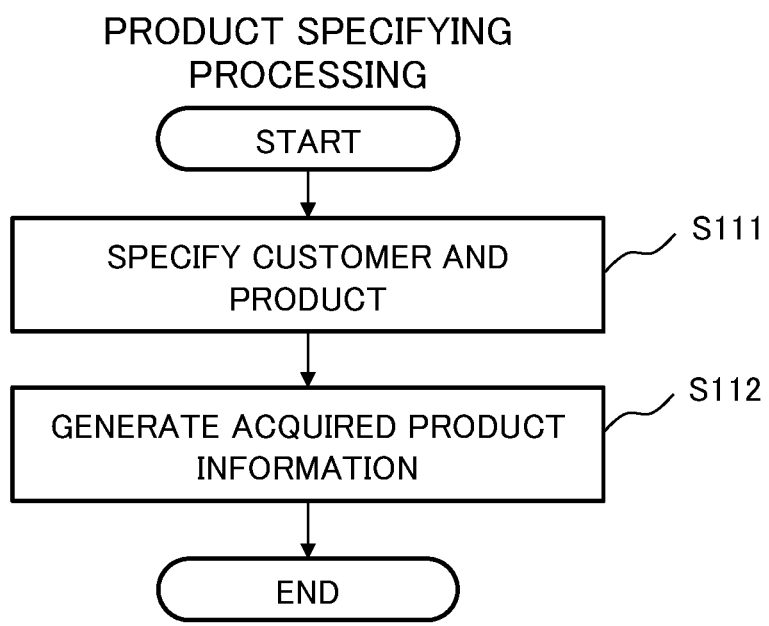
FIG. 10 is a flowchart illustrating product specifying processing according to the first example embodiment.

FIG. 10 is a flowchart illustrating the product specifying processing according to the first example embodiment. The product specifying processing is executed every time each customer belonging to the group acquires a product to be purchased in the store after the customer information generation/association processing.

The product specifying unit 130 specifies the customer who has acquired a product and the acquired product (step S111). For example, the product specifying unit 130 specifies the customer C1 who has acquired the product I1.

The product specifying unit 130 generates (updates) the acquired product information (step S112). For example, the product specifying unit 130 generates (updates) the acquired product information as illustrated in FIG. 8.

(Payment Execution Processing)

Figure 11:
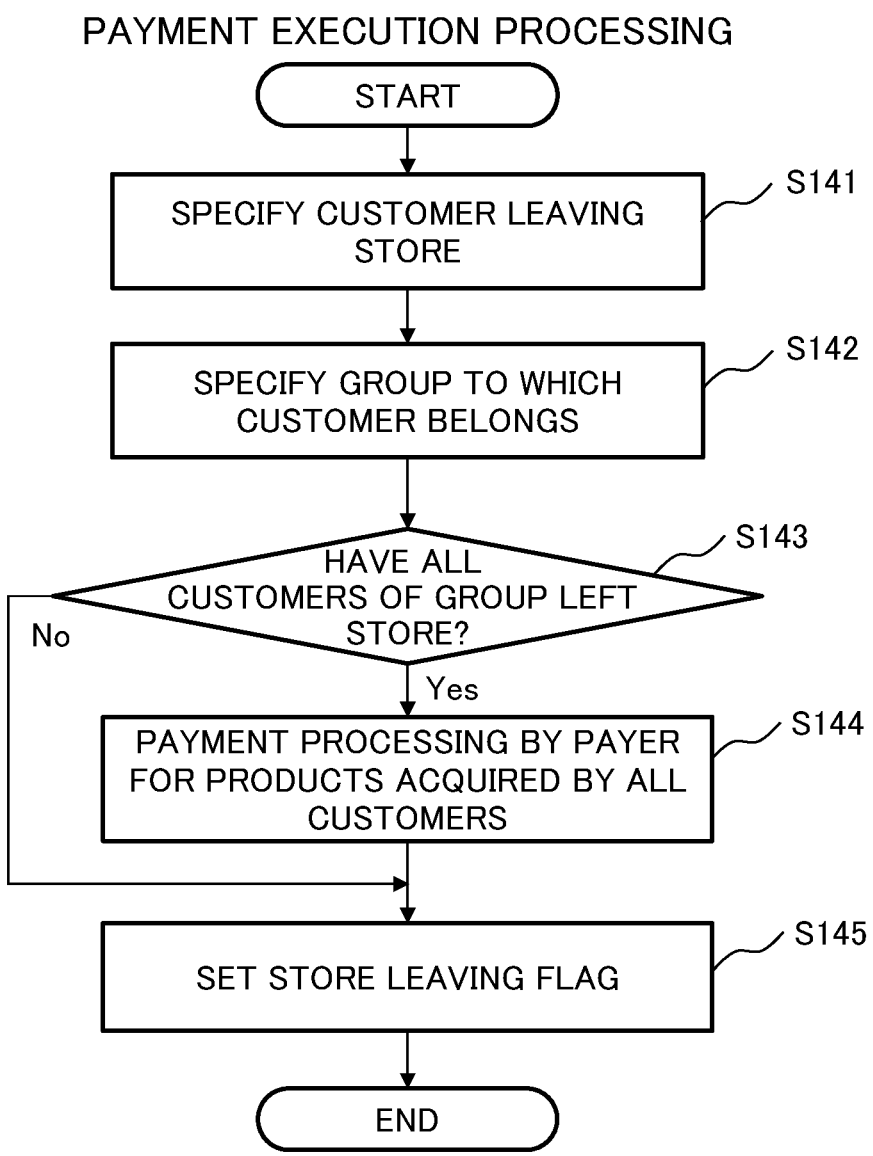
FIG. 11 is a flowchart illustrating an example of payment execution processing according to the first example embodiment.

FIG. 11 is a flowchart illustrating an example of payment execution processing according to the first example embodiment. The payment execution processing is executed every time the customer shopping in the group leaves the store.

Here, it is assumed that the customers C1, C2, and C3 separately leave the store in the order of C1, C2, and C3.

The payment processing unit 140 specifies the customer leaving the store (step S141). The payment processing unit 140 specifies the group to which the customer belongs (step S142). The payment processing unit 140 determines whether all customers of the group have left the store (step S143). In step S143, in a case where all the customers of the group have left the store (step S143/Yes), the payment processing unit 140 performs payment processing by the payer for the products acquired by all the customers (step S144). In a case where all the customers of the group have not left the store (step S143/No), the payment processing is not executed. The payment processing unit 140 sets the store leaving flag in the customer information of the customer leaving the store to "y" (step S145).

For example, when the customer C3 leaves the store after the customers C1 and C2, the payment processing unit 140 specifies the group G1 to which the customer C3 belongs on the basis of the group information of FIG. 6. At this point, in the customer information of FIG. 4, the store leaving flag of other customers C1 and C2 belonging to the group G1 is "y", and all the customers of the group leave the store when the customer C1 leaves the store. The payment processing unit 140 acquires I1, I2, and I3 as IDs of the products acquired by the customers C1, C2, and C3 from the acquired product information of FIG. 8. The payment processing unit 140 acquires settlement information A1 of the payer C1 from the customer information of FIG. 4. The payment processing unit 140 performs the settlement processing for the products I1, I2, and I3 using the settlement information A1.

Figure 12:
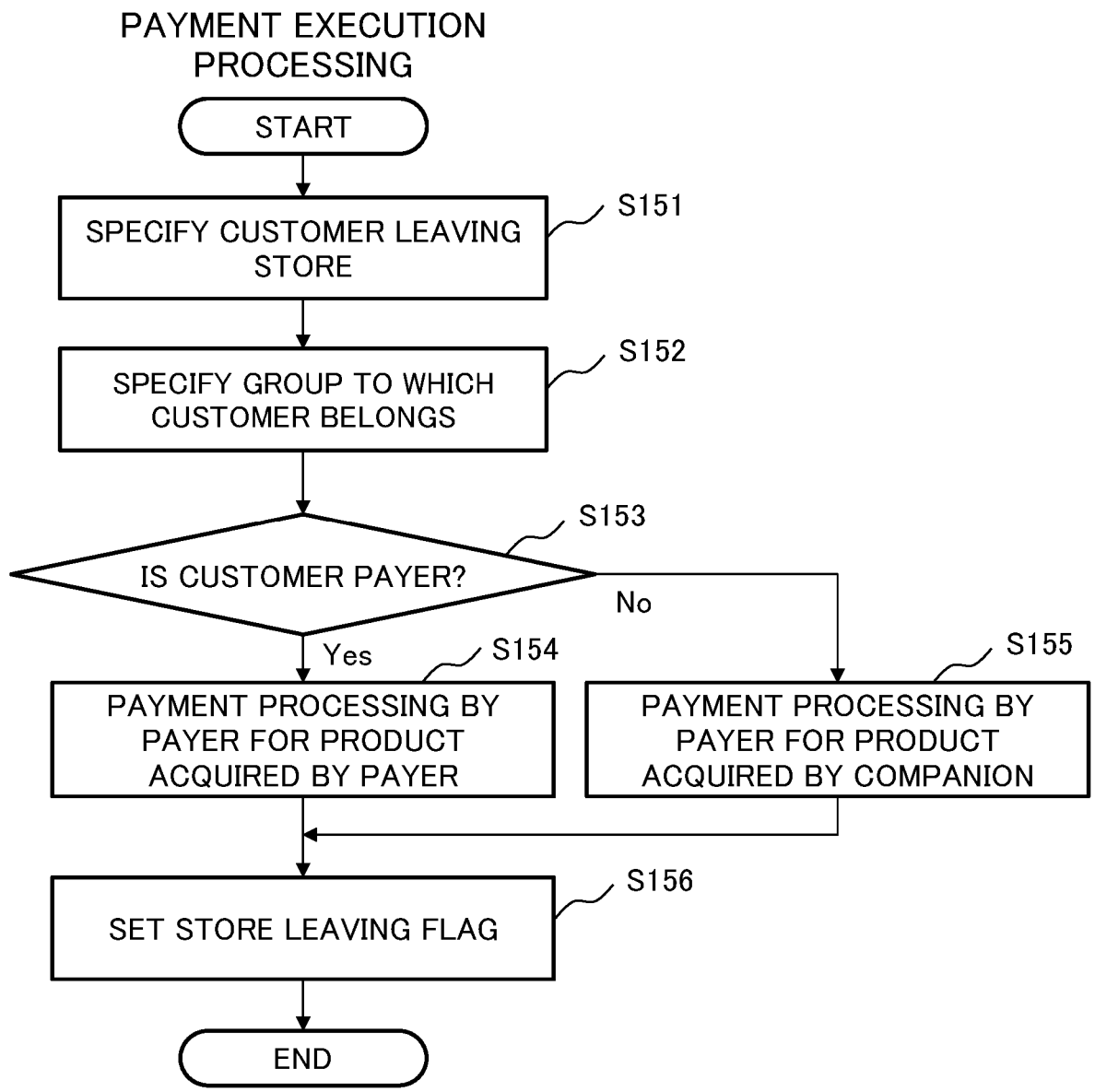
FIG. 12 is a flowchart illustrating another example of payment execution processing according to the first example embodiment.

FIG. 12 is a flowchart illustrating another example of the payment execution processing according to the first example embodiment.

The payment processing unit 140 specifies the customer leaving the store (step S151). The payment processing unit 140 specifies the group to which the customer belongs (step S152). The payment processing unit 140 determines whether the customer is the payer (step S153). In step S153, in a case where the customer is the payer (step S153/Yes), the payment processing unit 140 performs the payment processing by the payer for the product acquired by the customer (step S154). In step S153, in a case where the customer is not the payer (is a companion) (step S153/No), the payment processing unit 140 performs the payment processing by the payer for the product acquired by the companion (step S155). The payment processing unit 140 sets the store leaving flag in the customer information of the customer leaving the store to "y" (step S156).

For example, when the customer C2 leaves the store, the payment processing unit 140 specifies the group G1 to which the customer C2 belongs on the basis of the group information of FIG. 6. The payment processing unit 140 acquires the product I2 acquired by the customer C2 from the acquired product information of FIG. 8. The payment processing unit 140 acquires the settlement information A1 of the payer C1 from the customer information of FIG. 4. The payment processing unit 140 performs the settlement processing for the product I3 using the settlement information A1.

Thus, the operation of the first example embodiment is completed.

[Effects]

According to the first example embodiment, when a plurality of customers is shopping in a group, a companion can continue shopping even after the payer has left the store. The reason thereof is as follows. That is, the customer associating unit 120 of the payment processing apparatus 100 associates a plurality of customers who has entered the store, and the product specifying unit 130 specifies a product acquired by each of the plurality of customers in the store. The reason is because the payment processing unit 140 then collectively performs the payment processing by the customer who is the payer among the plurality of customers for products acquired by the plurality of customers when it has been detected that all of the plurality of customers have left the store. Alternatively, the reason is because the payment processing unit 140 performs the payment processing by the customer who is the payer among the plurality of customers for the product acquired by the customer when it has been detected that each of the plurality of customers has left the store. Thus, the companion can purchase the product acquired after the payer leaves the store by payment of the payer without being bound by the schedule of the payer for leaving the store.

Modification Example 1

The product specifying unit 130 specifies a product and a customer who has acquired the product on the basis of the image data acquired by the cameras 10. However, it is not limited thereto, and the product specifying unit 130 can use other known techniques for specifying the product and the customer who has acquired the product. For example, the product specifying unit 130 may specify the product and the customer who has acquired the product by information or a combination of information acquired from at least one of cameras, infrared sensors, pressure sensors, weight sensors, or sound sensors provided in the store.

Modification Example 2

The customer information may include information of a mobile terminal (telephone number, mail address, and the like) of the customer. The information of the mobile terminal is used, for example, for various notifications to the customer. For example, the payment processing unit 140 outputs a notification for performing the payment processing to the mobile terminal of the payer. For example, in a case where the payment processing is performed, the payment processing unit 140 gives a notification of the product for which the payment has been performed, the customer who has acquired the product, the total price of the product, and the like.

Figure 13:
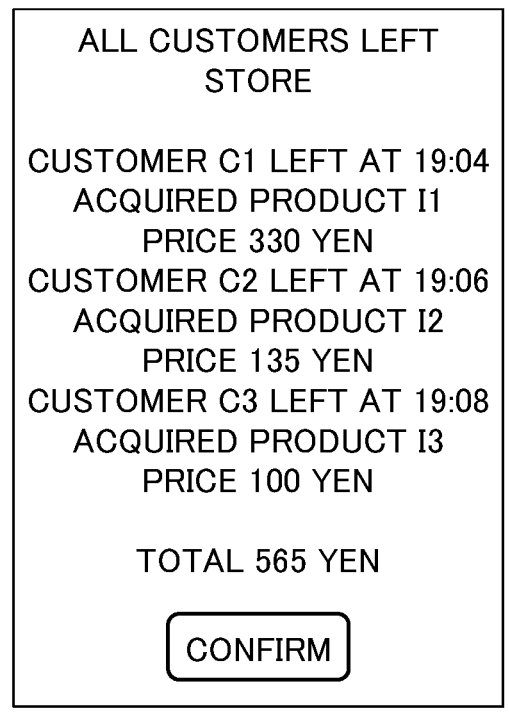
FIG. 13 is a diagram illustrating an example of a notification screen for a payer according to the first example embodiment.
Figure 14:
FIG. 14 is a diagram illustrating another example of a notification screen for the payer according to the first example embodiment.

FIGS. 13 and 14 are diagrams illustrating an example of a notification screen to the payer according to the first example embodiment. For example, the payment processing unit 140 transmits a notification screen as illustrated in FIG. 13 or 14 to the mobile terminal of the payer.

Modification Example 3

The customer information may include an upper limit of the total price of products acquired by a customer of the group in addition to the information of the mobile terminal of the customer. The group information may include the upper limit of the total price. The upper limit of the total price is set by the payer, for example. In a case where the total price exceeds the upper limit, the product specifying unit 130 outputs a notification to the mobile terminal of the payer.

The product specifying unit 130 may output the notification to the mobile terminal of the customer who has acquired the product exceeding the upper limit of the total price. The product specifying unit 130 may output a notification to an electronic shelf label of a product or a signage device in the vicinity of an area in which the product is placed, toward a customer who has acquired the product exceeding the upper limit of the total price.

The notification is, for example, a message such as "purchasing the product acquired just now will exceed the set maximum amount" displayed on various display devices.

Modification Example 4

The payment processing unit 140 may output an alert in the vicinity of the exit or output an alert to an administrator or the like in a case where the customer attempting to leave the store after acquiring a product does not belong to the group and the settlement information is not registered in the customer information of the customer. In this case, the payment processing unit 140 may control the gate provided at the exit in such a way that the customer cannot leave the store.

Second Example Embodiment

In the first example embodiment, when customers who shop in a group enter the store together (continuously), customers belonging to the same group are determined. A second example embodiment is different from the first example embodiment in that customers belonging to the same group are determined when customers who shop in a group stay in an association area in the store. In the second example embodiment, there is no need for customers who shop in a group to enter the store together, and the customers can enter the store separately.

[Configuration]

Figure 15:
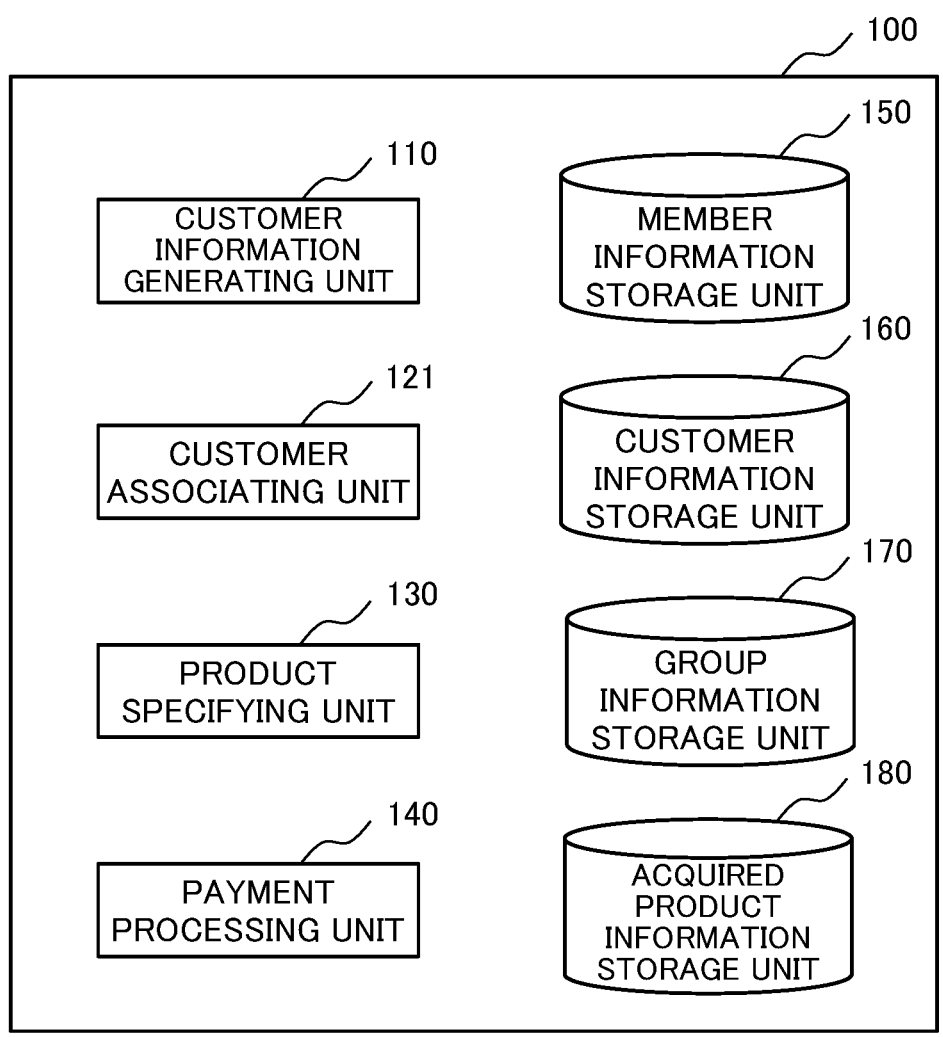
FIG. 15 is a block diagram illustrating a configuration of a payment processing apparatus 100 according to a second example embodiment.

FIG. 15 is a block diagram illustrating a configuration of a payment processing apparatus 100 according to a second example embodiment. The payment processing apparatus 100 includes a customer associating unit 121 instead of the customer associating unit 120 of the first example embodiment.

When customers who shop in a group stay in an association area in the store, the customer associating unit 121 specifies a customer belonging to the group and generates the group information.

Figure 16:
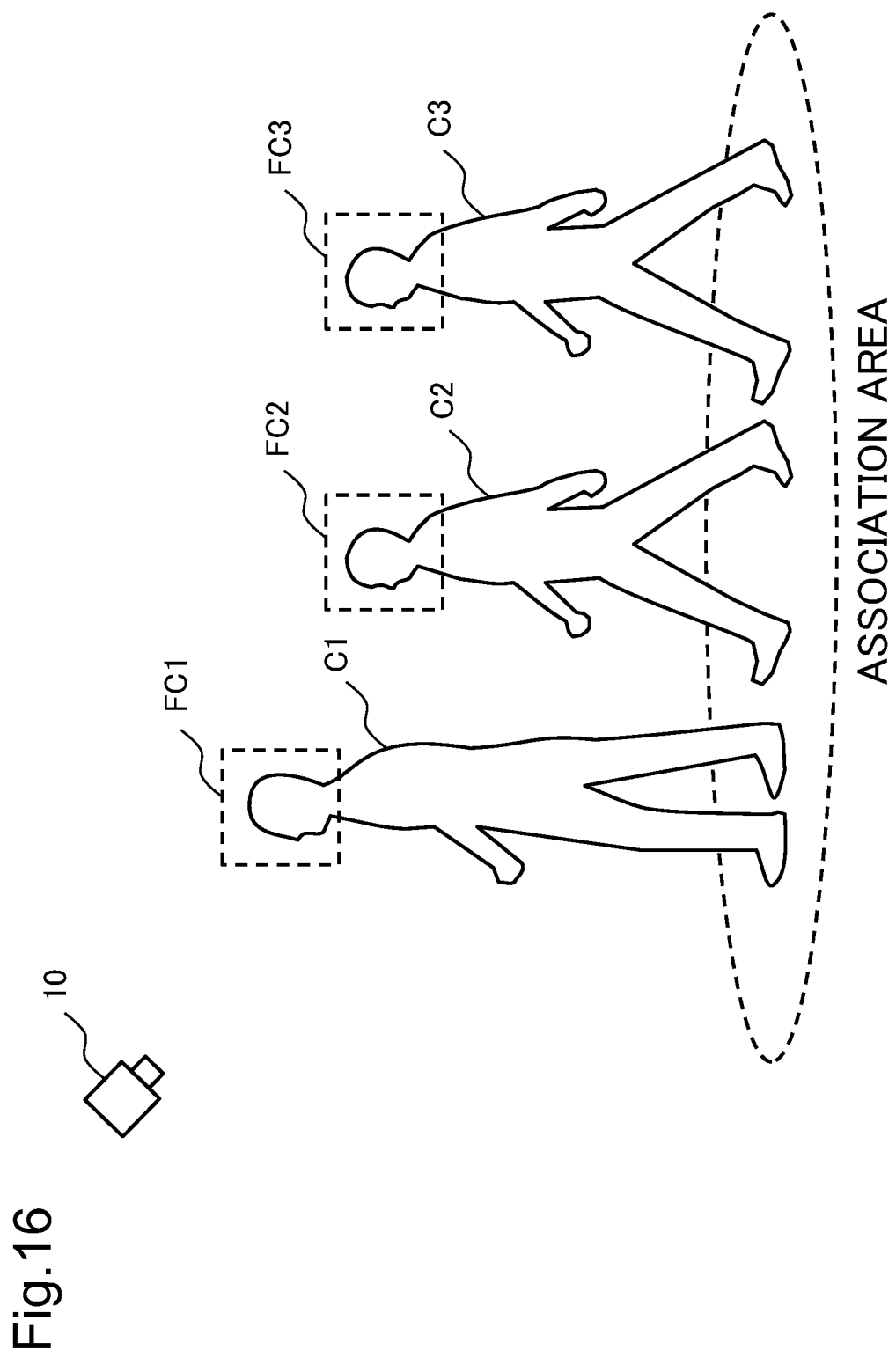
FIG. 16 is a diagram illustrating an example of an association area according to the second example embodiment.

FIG. 16 is a diagram illustrating an example of an association area according to the second example embodiment. The association area is, for example, a range captured by the camera 10 provided in the vicinity of the area. The association area may be indicated, for example, by a marked floor, or may be an area partitioned by a curtain, fence, panel, or wall.

The customer associating unit 121 acquires image data of the customers from the camera 10 provided near the association area. The customer associating unit 121 specifies each customer staying in the association area using the characteristic information of the customer obtained from the image data and the characteristic information of each customer included in the customer information read from the customer information storage unit 160. In the example of FIG. 16, the characteristic information FC1 to FC3 of the customers C1 to C3 are schematically as dashed line frames.

For example, the customer associating unit 121 specifies the customer staying in the association area as a customer belonging to the group at a designated timing Here, for example, the timing is designated by a store clerk or a customer through the input-output device, which is not illustrated, provided near the association area.

The customer associating unit 121 may specify customers who have behaved identically in the association area as customers belonging to the group. Specifically, the customer associating unit 121 recognizes a plurality of customers in the same pose or a plurality of customers connected by holding hands or placing arms around each other's shoulders by a known image recognition technology, and specifies these customers as customers belonging to the group. Thus, even in a case where the association area is not partitioned by a panel or a wall, it is possible to prevent a customer unintentionally reflected in an image from being specified as a customer of the group.

Similarly to the customer associating unit 120 of the first example embodiment, the customer associating unit 121 determines the payer of the group, displays the group confirmation screen on the input-output device (not illustrated) provided near the association area, and receives an input for approving the payer. The customer associating unit 121 generates group information and stores the group information in the group information storage unit 170.

[Operation]

Hereinafter, an operation of the payment processing apparatus according to the second example embodiment will be described with reference to the drawings.

Here, as in the first example embodiment, it is assumed that three customers, the customer who is the member M1 in the member information of FIG. 3 and two customers who are not members, shop in a group. However, it is assumed that the three customers enter the store at different timings and gather in the association area in the middle of shopping unlike the first example embodiment.

(Customer Information Generation Processing)

Figure 17:
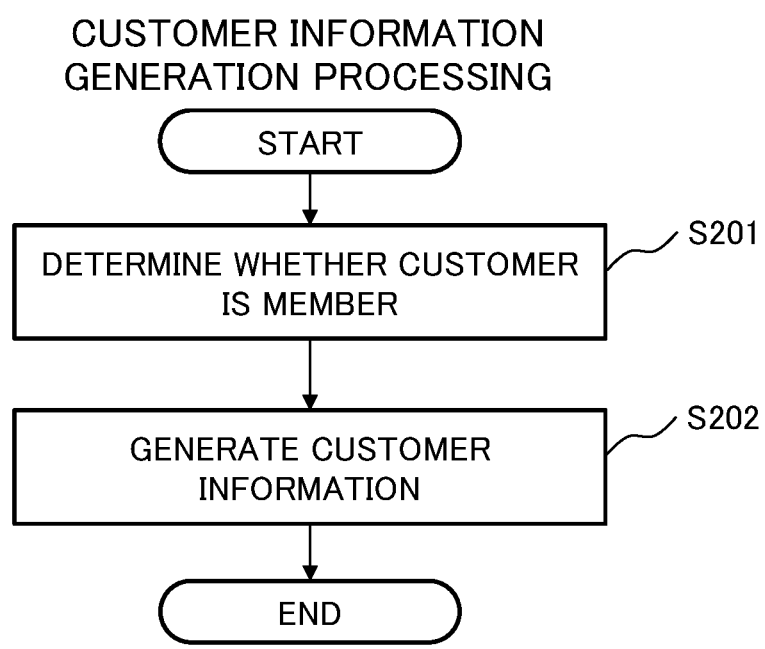
FIG. 17 is a flowchart illustrating customer information generation processing according to the second example embodiment.

FIG. 17 is a flowchart illustrating customer information generation processing according to the second example embodiment. The customer information generation processing is executed, for example, every time the customer enters the store.

When the customer enters the store, the customer information generating unit 110 determines whether the customer who has entered the store is a member, as in step S102 described above (step S201). As in step S103 described above, the customer information generating unit 110 generates customer information regarding the customer who has entered the store (step S202).

For example, as illustrated in FIG. 4, the customer information generating unit 110 generates the customer information of the customers C1, C2, and C3.

(Product Specifying Processing)

A flowchart illustrating the product specifying processing of the payment processing apparatus according to the second example embodiment is similar to that of the first example embodiment (FIG. 10). In the second example embodiment, the product specifying processing is executed every time each customer who has entered the store at a different timing belonging to the group acquires a product to be purchased.

For example, the product specifying unit 130 generates (updates) the acquired product information as illustrated in FIG. 8.

(Association Processing)

Figure 18:
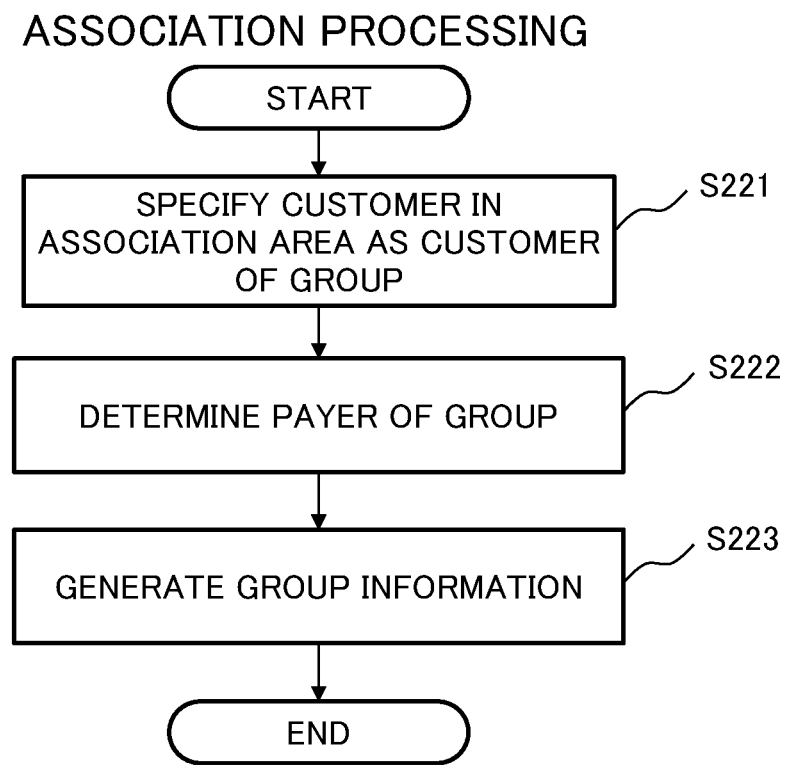
FIG. 18 is a flowchart illustrating association processing according to the second example embodiment.

FIG. 18 is a flowchart illustrating association processing according to the second example embodiment. The association processing is executed at a timing designated by a store clerk or a customer through the input-output device provided near the association area at a timing when the customers belonging to the group are present in the association area. The association processing may be performed before or after each customer belonging to the group acquires a product to be purchased. The acquisition of the product to be purchased may be continued.

Here, it is assumed that the customers C1, C2, and C3 stay in the association area.

The customer associating unit 121 specifies a customer staying in the association area as a customer belonging to the group (step S221). For example, the customer associating unit 121 specifies the customers C1, C2, and C3 staying in the association area as customers belonging to the group.

As in step S106, the customer associating unit 121 determines the payer of the group (step S222). For example, the customer associating unit 121 determines the customer C1 of which the settlement information is set in the customer information of FIG. 4 as the payer.

The customer associating unit 121 generates the group information as in step S107 (step S223). For example, the customer associating unit 121 generates the group information as illustrated in FIG. 6.

(Payment Processing)

A flowchart illustrating payment processing of the payment processing apparatus according to the second example embodiment is similar to that of the first example embodiment (FIG. 11).

For example, the payment processing unit 140 performs the payment processing for the products I1, I2, and I3 using the settlement information A1 of the payer C1 on the basis of the group information in FIG. 6, the acquired product information in FIG. 8, and the customer information in FIG. 4.

[Effects]

According to the second example embodiment, when a plurality of customers is shopping in a group, a companion can start shopping before the payer enters a store. This is because the customer associating unit 121 associates a plurality of customers staying at a predetermined timing in a predetermined area in the store. Thus, the companion can purchase the product acquired before the payer enters the store by payment of the payer without being bound by a schedule of the payer to enter the store.

Third Example Embodiment

A third example embodiment will be described.

Figure 19:
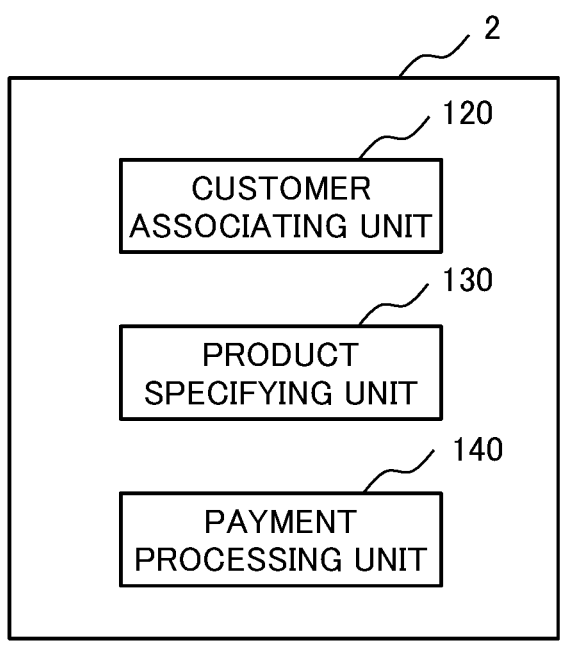
FIG. 19 is a block diagram illustrating a configuration of a payment processing system 2 according to a third example embodiment.

FIG. 19 is a block diagram illustrating a configuration of a payment processing system 2 according to a third example embodiment.

A payment processing system 2 includes a customer associating unit 120, a product specifying unit 130, and a payment processing unit 140. The customer associating unit 120, the product specifying unit 130, and the payment processing unit 140 are an example embodiment of a customer associating means, a product specifying means, and a payment processing means in the present disclosure.

The customer associating unit 120 associates a plurality of customers with one another. For example, the customer associating unit 120 associates a plurality of customers having the designated number of customers who have continuously entered the store.

The product specifying unit 130 specifies products acquired by each of the plurality of customers in the store. For example, the product specifying unit 130 specifies the customer who has acquired the product and the acquired product on the basis of the image data acquired by the camera provided in the store.

When it has been detected that all of the plurality of customers have left the store, the payment processing unit 140 processes payment by the customer who is the payer, among the plurality of customers, collectively for the products acquired by the plurality of customers. Alternatively, when it has been detected that each of the plurality of customers has left the store, the payment processing unit 140 processes payment for the products acquired by the customer, by the customer who is the payer among the plurality of customers. For example, the payment processing unit 140 performs payment processing using settlement information of a payer designated when a plurality of customers is associated.

[Effects]

According to the third example embodiment, when a plurality of customers is shopping in a group, a companion can continue shopping even after the payer has left the store. The reason thereof is as follows. That is, the customer associating unit 120 of the payment processing system 2 associates a plurality of customers, and the product specifying unit 130 specifies a product acquired by each of the plurality of customers in the store. The reason is because the payment processing unit 140 then collectively performs the payment processing by the customer who is the payer among the plurality of customers for products acquired by the plurality of customers when it has been detected that all of the plurality of customers have left the store. Alternatively, the reason is because the payment processing unit 140 performs the payment processing by the customer who is the payer among the plurality of customers for the product acquired by the customer when it has been detected that each of the plurality of customers has left the store.

Modification Example (Hardware Configuration)

In each of the example embodiments described above, each component of the payment processing apparatus 100 and the payment processing system 2 represents a functional unit block. Some or all of the components of each device may be achieved by any combination of a computer 500 and a program.

Figure 20:
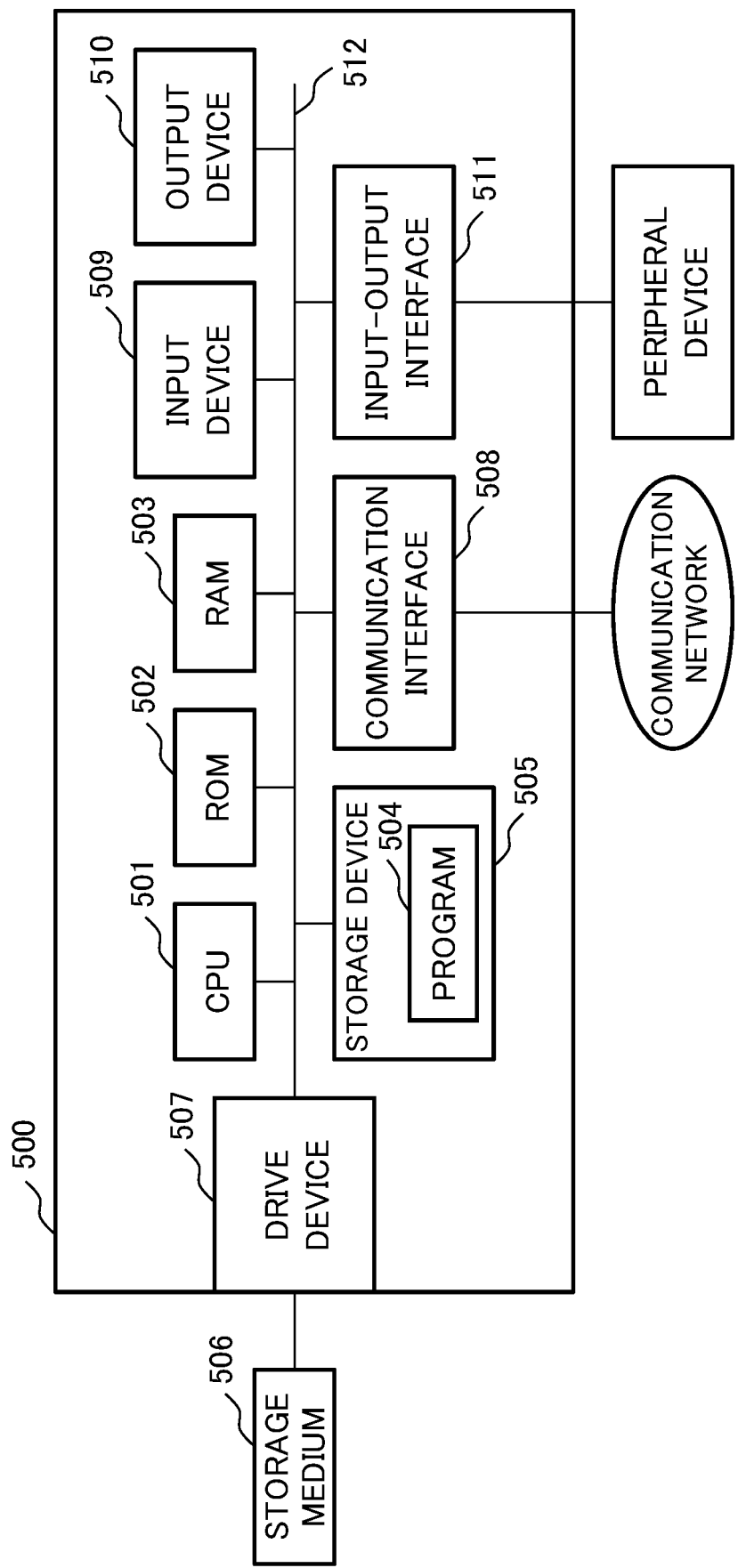
FIG. 20 is a block diagram illustrating an example of a hardware configuration of a computer 500.

FIG. 20 is a block diagram illustrating an example of a hardware configuration of the computer 500. Referring to FIG. 20, the computer 500 includes, for example, a central processing unit (CPU) 501, a read only memory (ROM) 502, a random access memory (RAM) 503, a program 504, a storage device 505, a drive device 507, a communication interface 508, an input device 509, an input-output interface 511, and a bus 512.

The program 504 includes instructions for achieving the functions of each device. The program 504 is stored in advance in the ROM 502, the RAM 503, and/or the storage device 505. The CPU 501 achieves the functions of each device by executing instructions included in the program 504. For example, when the CPU 501 of the payment processing apparatus 100 executes instructions included in the program 504, the payment processing apparatus 100 implements the functions of the customer information generating unit 110, the customer associating unit 120, the product specifying unit 130, and the payment processing unit 140. The RAM 503 may store data to be processed in the functions of each device. For example, the RAM 503 of the management server 400 may store the registration information, the customer information, the group information, and the acquired product information.

The drive device 507 reads and/or writes on the recording medium 506. The communication interface 508 provides an interface with a communication network. The input device 509 includes, for example, a mouse, a keyboard, and/or the like, and receives an input of information from an administrator or the like. The output device 510 is, for example, a display and outputs (displays) information to an administrator or the like. The input-output interface 511 provides an interface with a peripheral device. The above-described cameras 10 are connected to the input-output interface 511. The bus 512 connects these hardware components. The program 504 may be supplied to the CPU 501 via a communication network, or may be stored in the recording medium 506 in advance, read by the drive device 507, and supplied to the CPU 501.

The hardware configuration illustrated in FIG. 20 is an example, and other components may be added or some of the components are not necessary to be included.

There are various modification examples of the implementation method of each device. For example, each device may be achieved by any combination of a computer and a program different for each component. A plurality of components included in each device may be achieved by any combination of one computer and a program.

Some or all of the components of each device may be achieved by general-purpose or dedicated circuitry including a processor or the like, or a combination thereof. These circuits may be configured by a single chip or may be configured by a plurality of chips connected via a bus. Some or all of the components of each device may be achieved by a combination of the above-described circuit or the like and a program.

When some or all of the components of each device is achieved by a plurality of computers, circuits, and the like, the plurality of computers, circuits, and the like may be arranged in a centralized manner or in a distributed manner.

At least a part of the payment processing apparatus 100 may be provided in a Software as a Service (SaaS) format. That is, at least a part of the functions for implementing the payment processing apparatus 100 may be executed by software executed via a network.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims. The configurations according to the example embodiments can be combined with each other without departing from the scope of the present disclosure.

This application is based upon and claims the benefit of priority from Japanese Patent Application No. 2020-057433, filed on Mar. 27, 2020, the disclosure of which is incorporated herein in its entirety by reference.

REFERENCE SIGNS LIST 100 payment processing apparatus
10 camera 20 shelf
110 customer information generating unit
120 customer associating unit
130 product specifying unit
140 payment processing unit
150 member information storage unit
160 customer information storage unit
170 group information storage unit
180 acquired product information storage unit

The invention claimed is:

1. A payment processing system comprising:
   at least one memory configured to store storing instructions; and
   at least one processor configured to execute the instructions to:
   associate a plurality of customers with one another;
   specify a product acquired by each of the plurality of customers in a store;
   determine whether a customer leaving the store is one of the plurality of customers associated with one another;
   upon determining that the customer leaving the store is one of the plurality of customers associated with one other, determine whether all of the plurality of customers associated with one another have left the store, such that the customer who left the store is, of the plurality of customers associated with one another, a last customer that left the store, and such that no other of the plurality of customers remain in the store;
   upon determining that all of the plurality of customers associated with one another have left the store:
   calculate a sum of prices of products acquired by all the plurality of customers associated with one another; and
   perform processing of collective payment to the store by a customer who is a payer among the plurality of customers, for the calculated sum, such that the payer pays for all the products acquired by all the plurality of customers, and such that one payment is made for all the products acquired by the plurality of customers after all the plurality of customers have left the store.

2. The payment processing system according to claim 1, wherein the at least one processor is further configured to execute the instructions to:
   associate a plurality of customers staying at a predetermined timing in a predetermined area in the store.

3. The payment processing system according to claim 2, wherein the at least one processor is further configured to execute the instructions to:
   associate a plurality of customers who have behaved identically in the predetermined area in the store.

4. The payment processing system according to claim 1, wherein the at least one processor is further configured to execute the instructions to:
   associate a plurality of customers continuously entering the store.

5. The payment processing system according to claim 1, wherein the at least one processor is further configured to execute the instructions to:
   set a customer of which settlement information is registered among the plurality of customers as the payer; and
   perform payment processing using the settlement information of the payer.

6. The payment processing system according to claim 5, wherein the at least one processor is further configured to execute the instructions to:
   determine that there is a plurality of customers of which the settlement information is registered among the plurality of customers; and
   receive a designation of the customer to be set as the payer among the customers of which the settlement information is registered.

7. The payment processing system according to claim 5, wherein the at least one processor is further configured to execute the instructions to:
   determine that there is no customer of which the settlement information is registered among the plurality of customers; and
   receive a designation of a customer to be set as the payer and an input of the settlement information of the customer.

8. The payment processing system according to claim 2, wherein the predetermined area is a part of the store for associating the plurality of customers.

9. The payment processing system according to claim 2, wherein a position of the predetermined area is indicated by a marked floor or a partition.

10. The payment processing system according to claim 2, wherein the at least one processor is further configured to execute the instructions to:
    associate a plurality of customers at a timing designated by a store clerk or one of the plurality of the customers.

11. The payment processing system according to claim 3, wherein the at least one processor is further configured to execute the instructions to:
    detect from an image of the predetermined area, a plurality of customers in a same pose or connected to each other; and
    associate the plurality of customers in the same pose or connected to each other.

12. The payment processing system according to claim 4, wherein the at least one processor is further configured to execute the instructions to:
    associate a plurality of customers of a number designated by a head customer at a time of entrance of the head customer.

13. A payment processing method performed by a computer and comprising:
    associating a plurality of customers with one another;
    specifying a product acquired by each of the plurality of customers in a store;
    determining whether a customer leaving the store is one of the plurality of customers associated with one another;
    upon determining that the customer leaving the store is one of the plurality of customers associated with one other, determining whether all of the plurality of customers associated with one another have left the store, such that the customer who left the store is, of the plurality of customers associated with one another, a last customer that left the store, and such that no other of the plurality of customers remain in the store;
    upon determining that all of the plurality of customers associated with one another have left the store:
    calculating a sum of prices of products acquired by all the plurality of customers associated with one another; and
    performing processing of collective payment to the store by a customer who is a payer among the plurality of customers, for the calculated sum, such that the payer pays for all the products acquired by all the plurality of customers, and such that one payment is made for all the products acquired by the plurality of customers after all the plurality of customers have left the store.

14. A non-transitory recording medium that stores a program executable by a computer to execute perform processing comprising:
   associating a plurality of customers with one another;
   specifying a product acquired by each of the plurality of customers in a store;
   determining whether a customer leaving the store is one of the plurality of customers associated with one another;
   upon determining that the customer leaving the store is one of the plurality of customers associated with one other, determining whether all of the plurality of customers associated with one another have left the store, such that the customer who left the store is, of the plurality of customers associated with one another, a last customer that left the store, and such that no other of the plurality of customers remain in the store;
   upon determining that all of the plurality of customers associated with one another have left the store:
      calculating a sum of prices of products acquired by all the plurality of customers associated with one another; and
      performing processing of collective payment to the store by a customer who is a payer among the plurality of customers, for the calculated sum, such that the payer pays for all the products acquired by all the plurality of customers, and such that one payment is made for all the products acquired by the plurality of customers after all the plurality of customers have left the store.

* * * * *